United States Patent Office 3,281,451
Patented Oct. 25, 1966

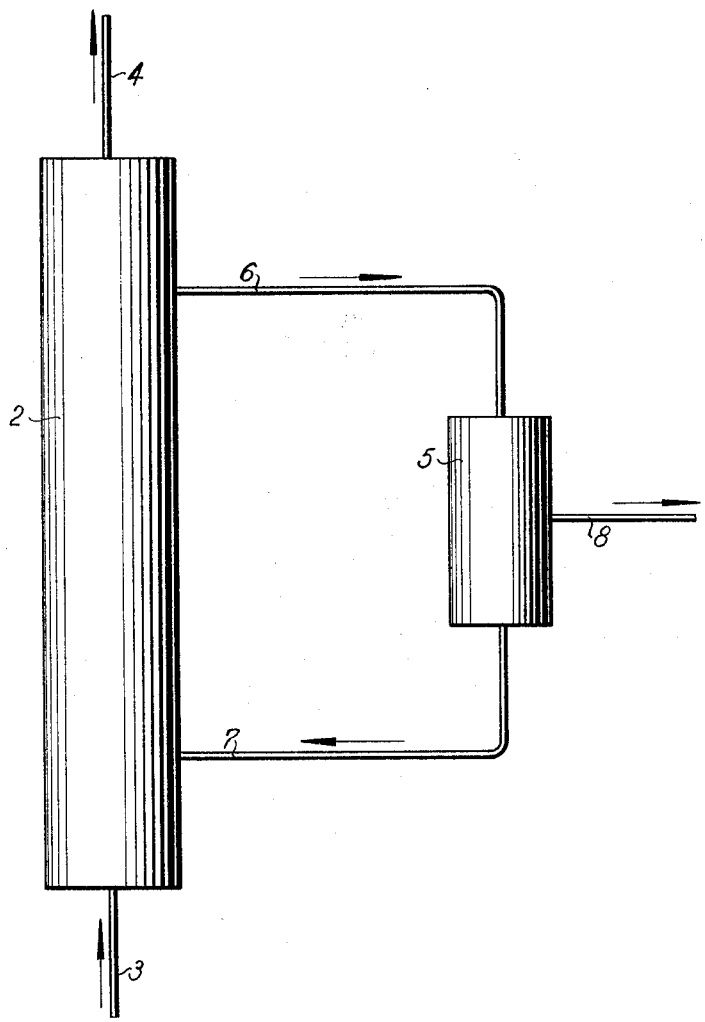

3,281,451
PROCESS FOR THE MANUFACTURE OF ACRYLONITRILE
Kurt Sennewald, Knapsack, near Cologne, Günter Legutke, Bruhl, near Cologne, and Alexander Ohorodnik, Liblar, Germany, assignors to Knapsack Aktiengesellschaft, Knapsack, near Cologne, Germany, a corporation of Germany
Filed Jan. 26, 1966, Ser. No. 524,963
4 Claims. (Cl. 260—465.3)

The present invention is a continuation-in-part application of application Serial No. 232,351 filed by Kurt Sennewald et al. on October 23, 1962, now abandoned and relates to a process for the manufacture of acrylonitrile from acetylene and hydrocyanic acid at a temperature of about 70 to 110° C. and a pressure of about 1 to 4 atmospheres absolute in an aqueous catalyst solution containing $Cu^I$-complex salts and 0.2 to 3.5 weight percent HCl, wherein the molar ratio of $Cu^+$ to the sum of the complex formers being selected from the group consisting of CuCl, HCl, KCl, NaCl and $NH_4Cl$ is up to 1:1.8.

It is known that acrylonitrile can be prepared by reacting hydrocyanic acid with acetylene in the presence of a liquid catalyst which contains complex-forming agents in addition to cuprous chloride. The complex-forming agents generally used include chlorides, for example NaCl, KCl and $NH_4Cl$.

In carrying out the above synthesis on an industrial scale, the catalyst mostly used is an aqueous solution of cuprous chloride and potassium chloride as the complex-forming agent, the catalyst being activated by incorporating therewith a small amount of hydrogen chloride. Such catalyst solution generally contains, per liter of solution, about 5.5 mols CuCl=34.5% by weight and about 5.3 mols KCl=24.5% by weight. The hydrogen chloride is used in a very small concentration which generally varies within the limits of about 0.2 to 3.5% by weight. The catalysts having the above or a similar composition enable a maximum space/time yield of about 20 to 40 grams acrylonitrile per hour and per liter of catalyst solution to be obtained. Although it is generally known that the space/time yield or catalyst efficiency increases as the copper content thereof increases, and although such increase appears very desirable from an economic and technical point of view, it has been technically impossible to increase the catalyst efficiency beyond the above indicated limit.

However, the catalyst efficiency is not only a function of the copper concentration but also a function of the molar ratio of copper to the sum of the complex-forming agents and thus a function of the ratio of $Cu^+$:

$(CuCl+KCl+HCl+NH_4Cl+NaCl)$

The CuCl also appears in the sum of the complex-forming agents for practical reasons, since the chlorine bound therein participates in the complex formation. The greater this ratio the greater is the catalyst efficiency. Attempts have therefore been made in the manufacture of catalyst solutions to dissolve as large a quantity of cuprous-chloride as possible with as small a quantity of a complex-forming agent as possible. As regards the catalysts used in industry, it has not been possible previously, due to unfavorable solubility relations, to adjust therein a greater and hence more favorable ratio than about 1:1.8. For example, 5.2 mols KCl and 0.16 mol HCl per liter of catalyst solution enable not more than about 6.8 mols CuCl to be dissolved at a temperature of 80° C., corresponding to a molar ratio of $Cu^+$: $(CuCl+KCl+HCl)$ of about 1:1.8.

The pertinent literature admittedly describes processes for increasing the copper content of the catalyst solution but no methods which permit increasing the molar ratio beyond the above indicated ratio of about 1:1.8 in order thereby to improve the catalyst efficiency. As taught in German patent specification ("Auslegeschrift") No. 1,-034,170, the copper content of the catalyst solution can be increased by adding relatively large amounts of salt to the solution. Such addition has, however, the effect of considerably reducing the catalyst efficiency which according to the above patent can only be readjusted by adding a certain proportion of cobalt chloride and thus increased to 18 grams acrylonitrile per hour and liter of catalyst solution. German Patent 949,739 teaches that a higher catalyst efficiency of up to 40 grames acrylonitrile can be obtained by utilizing the ammonium chloride, formed upon the reaction by hydrolyzing hydrocyanic acid, for dissolving an additional amount of CuCl. Such operation does not, however shift the above-defined molar ratio in favor of an increased catalyst efficiency, since the dissolution of an additional amount of CuCl is always associated with the simultaneous formation of ammonium chloride and thus associated with an increase of the sum of the complex-formers.

The present invention is based on the unexpected observation that the efficiency of the catalyst customarily used can be considerably increased beyond the above mentioned limit efficiency to about 55 to 60 grams acrylonitrile, per liter of catalyst solution and per hour, by dissolving an additional amount of cuprous-chloride with the aid of cuprous-cyanide. It is thus possible to prepare catalyst solutions containing more than 75% by weight salt, more than 50% by weight CuCl and having a molar ratio of $Cu^+$ to the sum of the complex-formers as defined above of preferably between about 1:1.30 and 1:1.53.

U.S.A. patent specification 2,322,696 (Kurtz et al.) related to the preparation of 1-cyanobutadiene-(1.3) from vinylacetylene and hydrocyanic acid. The catalyst utilized is prepared from cuprous chloride, an ammonium, amine or alkali salt and a strong acid. An illustrative catalyst comprises CuCl, $NH_4Cl$, $H_2O$ and HCl.

U.S.A. patent specification 2,385,327 (Bradley et al.) relates to the production of acrylonitrile in a defined cycle of operation utilizing a cuprous salt solution. The catalyst solution is continuously withdrawn in part and dissolved acrylonitrile, unreacted acetylene and by-products are stripped. As a catalyst a solution of cuprous salt and a soluble salt of ammonia, amine or an alkali metal to complex with the cuprous salt is used. It is stated that the catalyst should be highly concentrated with respect to cuprous chloride.

Neirther Kurtz et al. nor Bradley et al. teach or render obvious the present invention. Both teach catalyst systems acknowledged as old in the art. Neither teach a ratio falling within the terms of the claimed invention. Neither teach the addition of excess CuCl and CuCN to obtain the desired ratio. In fact, neither reference mentions CuCN much less suggests that it be added with excess CuCl to increase the copper concentration. While the references may state that higher copper concentrations are desirable or that proportions may be varied, this merely poses the problem without giving the solution or answering the critical question of how to increase the copper concentration. This is the novel contribution of the present invention to the art.

The solution of the posed problem is not merely the addition of more cuprous chloride initially since this material is insoluble. Excess cuprous chloride would not be dissolved. Our invention is that the highly favorable catalyst ratio can be obtained by adding and dissolving additional CuCl in the catalyst solution with the aid of cuprous cyanide. The result is increased catalyst efficiency.

Kurtz et al. specify no catalyst efficiency for acrylonitrile production and calculations from the data in the table of Bradley et al. when considered with the 700 cc. catalyst volume result in the best efficiency of merely 14.3 grams acrylonitrile per liter/per hour. The acrylonitrile yield is merely 74% or 85% calculated on acetylene or HCN respectively consumed.

It has also been found that the highly concentrated catalyst solutions of the present invention are most advantageously prepared under specific reaction conditions in the reaction vessel illustrated diagrammatically in the accompanying drawing. As shown in Example 2 below, it is not obligatory that preformed, finished cuprous-cyanide be used as the starting material. The additional amount of cuprous-chloride can also be dissolved by introducing simultaneously acetylene and an excess of hydrocyanic acid.

The mechanism according to which the cuprous-chloride undergoes dissolution is not yet known. Moreover, the conceptions on the structure of the numerous complex compounds which are being formed are rather vague. It is, however, certain that the Cn-ion of the cuprous-cyanide, which participates in the dissolving reaction, is substantially replaced by the Cl--ion of the hydrogen chloride always present in the catalyst, and is converted into free HCN. This statement finds clear support by the analysis of the catalyst solution indicated in Example 2 below.

More particularly, in the present process for the manufacture of acrylonitrile from acetylene and hydrocyanic acid at a temperature of about 70 to 110° C. and a pressure of about 1 to 4 atmospheres absolute in an aqueous catalyst solution containing $Cu^I$-complex salts and 0.2 to 3.5 weight percent HCl, wherein the molar ratio of $Cu^+$ to the sum of the complex-formers being selected from the group consisting of CuCl, HCl, NaCl, KCl and $NH_4Cl$ is up to 1:1.8, the improvement comprises adjusting the molar ratio as defined above to a value of about 1:1.6 to about 1:1.25 by dissolving additional CuCl in the catalyst solution saturated with CuCl by adding thereto CuCl and CuCN.

The additional cuprous-chloride and more especially the last portions thereof to be dissolved for concentrating the catalyst solution saturated with CuCl can be dissolved by the simultaneous introduction of hydrocyanic acid and acetylene, a relatively large excess of hydrocyanic acid being temporarily used in this introduction, if desired or necessary.

In the process of the present invention, the catalyst solution in a reaction zone is preferably concentrated by removing therefrom a portion of the catalyst solution continuously or intermittently, passing that portion through a storage zone charged with CuCl and then returning it to the reaction zone. The temperature in the storage zone is preferably below that prevailing in the reaction zone.

The CuCl-storage zone can also be used for removing additional amounts of freshly formed and more especially readily water-soluble complex-formers, such as $NH_4Cl$. To this end, the portion of catalyst solution introduced into the storage zone is diluted, for example, with about 4 to 10 times the amount of water, the CuCl-precipitate is allowed to deposit, and the supernatant aqueous solution is removed.

The following examples serve to illustrate the invention but they are not intended to limit it thereto, the percentages being by weight unless otherwise stated:

EXAMPLE 1

(a) Known process 5.5 liters of a catalyst solution containing 34.5% (5.5 mol/liter) CuCl, 24.5% (5.3 mol/liter) KCl, 0.2% HCl (0.08 mol/liter) and 40.8% water were charged at 82 to 85° C. under an excess pressure of 300 mm. mercury (i.e. an absolute pressure of about 1060 mm.) with 0.38 m.³/hr. (measured at N.T.P.) acetylene, 0.15 m.³/hr. nitrogen and 66 g./hr. hydrocyanic acid. The catalyst had an efficiency per liter and hour of 22 to 24 grams acrylonitrile. The molar ratio defined above of $Cu^+$ to the sum of the complex-formers was 1:1.98 and was calculated at follows: 5.5 mol/liter CuCl+5.3 mol/liter KCl+0.08 mol/liter HCl=10.88 mol/liter Cl-.

$$Cu^+:(CuCl+KCl+HCl)=5.5:10.88=1:1.98$$

The yield of acrylonitrile amounted to 85%, calculated on the acetylene converted, and to 90%, calculated on the hydrocyanic acid introduced.

(b) Process of the invention

In a catalyst solution of identical composition a further 1.5 mol/liter CuCl were dissolved at 82° C. with 2.5 mol/liter CuCN. The molar ratio defined above of 1:1.98 was thereby increased to 1:1.30. The catalyst solution was then charged at 82° C. to 84° C. under an excess pressure of 360 mm. mercury (i.e. an absolute pressure of about 1120 mm.) with about 0.6 m.³/hr. (measured at N.T.P.) acetylene, 0.2 m.³/hr. nitrogen and 110 to 120 g./hr. hydrocyanic acid. The reaction conditions were maintained constant and the HCl content was maintained at 0.6 to 0.8% (0.3–0.4 mol/liter). The mean catalyst efficiency, determined over a period of 260 hours, amounted to 40 grams acrylonitrile per liter of catalyst solution and per hour. The molar ratio of 1:1.30 was calculated as follows: 5.5 mol/liter CuCl+1.5 mol/liter CuCl+2.5 mol/liter CuCN=9.5 mol/liter $Cu^+$-ions. 7 mol/liter CuCl+5.3 mol/liter KCl+0.08 mol/liter HCl=12.38 mol/liter Cl--ions.

$$Cu^+:(CuCl+KCl+HCl)=9.5:12.38=1:1.30$$

While carrying through this process the molar ratio decreases to at most 1:1.34 due to the increasing HCl content. The yield of acrylonitrile amounted to 87%, calculated on the acetylene converted, and to 91%, calculated on the hydrocyanic acid introduced.

EXAMPLE 2

The catalyst solution was prepared in a reactor arranged as shown in the accompanying drawing.

The reaction vessel 2 was filled with a customary catalyst solution composed, for example, of 34.5% CuCl, 24.5% KCl, 0.2% HCl and 40.8% water. Storage tank 5 contained CuCl in an amount sufficient to adjust the content of CuCl in the whole catalyst solution, for example, to 50%.

The reaction vessel 2 was then set in operation under customary conditions by introducing acetylene and hydrocyanic acid through line 3. About ⅕ to 1/10 of the catalyst solution was then cycled by pumping through the CuCl-storage tank 5 via overflow line 6 and return line 7. The catalyst solution thereby absorbed continuously CuCl. The dissolution was accelerated by using initially a relatively large excess of hydrocyanic acid. Alternatively, storage tank 5 was charged beforehand with a mixture of CuCl and CuCN. In this manner, catalyst solutions containing at least 50% CuCl were prepared. Cloggings in the apparatus, due to crystallization, were avoided by maintaining the temperature in the CuCl-storage tank 5 at a level some degrees below the temperature in the reaction vessel itself. Apart from the high catalyst efficiency, the working method disclosed in the present example offered the advantage that the optimal molar ratio was adjusted automatically. The acetylene in excess and the acrylonitrile formed were removed from reaction vessel 2 through off-line 4.

A catalyst solution prepared in the manner just described and containing 50% CuCl and 0.6 to 1% HCl, into which 160 to 170 g./hr. HCN, 1 m.³/hr. $C_2H_2$ and 0.2 m.³/hr. $N_2$ were introduced under conditions analogous to those set forth in Example 1b), had an average efficiency of 55 to 60 grams acrylonitrile per liter of catalyst solution and per hour. 100 grams of this catalyst solution contained 0.495 mol $Cu^+$, 0.254 mol $K^+$, 0.022 mol $H^+$, 0.094 mol $NH_4^+$, 0.030 mol $CN^-$ and 0.743 mol $Cl^-$. From these figures, the following molar ratio as defined above of $Cu^+$ to the sum of the complex-formers was calculated:

$$Cu^+:Cl^-=0.495:0.743=1:1.50$$

The literature often indicates the numerical ratio of CuCl to KCl, in the present case 0.495:0.254=1.95:1, which is here cited for purposes of comparison. It should be noted that for proper judgement reference can only be made to the ratio of $Cu^+$ to the sum of the complex-formers, i.e. to the ratio of $Cu^+:Cl^-$, since complex-formers, e.g. $NH_4Cl$, are continuously formed during the reaction. These newly formed complex formers always shift the molar ratio in the direction of a reduced efficiency, so that the complex-former in excess must be continuously removed. If the content of hydrochloric acid and cyanide in the catalyst solution is maintained constant, the optimum molar ratio of $Cu^+$ to the sum of the complex-formers, which is necessary to maintain the catalyst efficiency, is most advantageously adjusted in the apparatus represented diagrammatically in the accompanying drawing.

$\frac{1}{2000}$ to $\frac{1}{1000}$ mol/hr. $NH_4Cl$ is formed per liter of catalyst solution which means that 1 mol $NH_4Cl$ would have to be removed per liter of catalyst solution in periods of 1000 to 2000 hours. According to the above analysis, one liter of catalyst solution contains, however, about 7 mols of complex-forming agents ($KCl+NH_4Cl$). In other words, every $\frac{1}{7}$ of the catalyst quantity would have to be admixed with water within a period of 1000 to 2000 hours, the CuCl precipitated, and the complex-formers ($KCl+NH_4Cl$) dissolved in the water disposed of. The maintenance of the catalyst efficiency is thus confined to precipitating the whole catalyst quantity once per year.

A further advantage offered by the present invention resides in the fact that the CuCl-storage tank 5 can be used both for preparing the concentrated catalyst solutions and for removing the complex-formers in excess. For this purpose, depending on the excess of complex formers, $\frac{1}{10}$ to $\frac{1}{100}$ of the catalyst solution is introduced into storage tank 5, diluted therein with 4 to 10 times the amount of water, the resulting CuCl-precipitate is allowed to deposit and the supernatant water is drawn off through line 8. A part of the catalyst solution is then cycled by pumping through the very same storage tank 5, the precipitated CuCl being rapidly dissolved again. This working method enables the catalyst efficiency to be maintained for a substantially unlimited period of time.

In Example 2, the yield of acrylonitrile amounted to 91 to 93%, calculated on the hydrocyanic acid introduced, or to 89%, calculated on the acetylene converted. The following by-products were also obtained:

6.1% monovinylacetylene
4.0% acetaldehyde
0.4% cyanobutadiene
0.04% methylvinylketone
0.01% divinylacetylene
0.03% chloroprene
0.03% vinyl chloride and
0.04% unknown component.

The reaction gases leaving the catalyst solution were washed as usual and crude acrylonitrile was obtained containing:

98.6% acrylonitrile
0.04% methylvinylketone
0.02% divinylacetylene
0.3% cis-1-cyanobutadiene and
0.1% trans-1-cyanobutadiene.

The above example shows clearly that the process of the present invention enables both the degree of purity and the yields of acrylonitrile obtained to be considerably improved as compared with the art, the yield being calculated on acetylene and hydrocyanic acid.

We claim:
1. In the process for the manufacture of acrylonitrile from acetylene and hydrocyanic acid at a temperature of about 70 to 110° C. and a pressure of about 1 to 4 atmospheres absolute in an aqueous catalyst solution containing $Cu^I$-complex salts and 0.2 to 3.5 weight percent HCl, wherein the molar ratio of $Cu^+$ to the sum of the complex formers being selected from the group consisting of CuCl, HCl, NaCl, KCl and $NH_4Cl$ is up to 1:1.8, the improvement which comprises adjusting the molar ratio as defined above to a value of about 1:1.6 to about 1:1.25 by dissolving additional CuCl in the catalyst solution saturated with CuCl by adding thereto a mixture of CuCl and CuCN.

2. The process of claim 1, wherein the additional cuprous chloride to be dissolved for concentrating the catalyst solution saturated with CuCl is dissolved by the simultaneous introduction of acetylene and an excess of hydrocyanic acid.

3. The process of claim 1, wherein the catalyst solution in a reaction zone is concentrated by removing therefrom a portion of the catalyst solution, passing the portion removed through a storage zone containing CuCl, and returning that portion to the reaction zone.

4. The process of claim 3, wherein newly formed and readily water-soluble complex-formers are removed from the storage zone containing CuCl by diluting with water the portion of catalyst solution introduced into the storage zone, allowing the CuCl-precipitate to deposit, and removing the supernatant aqueous solution.

No references cited.

CHARLES B. PARKER, *Primary Examiner.*
JOSEPH P. BRUST, *Assistant Examiner.*